April 3, 1934. E. G. BUDD ET AL Re. 19,130
MACHINE AND METHOD FOR ROLLING TAPERED DISKS AND ARTICLE PRODUCED THEREBY
Original Filed July 3, 1919 3 Sheets-Sheet 1
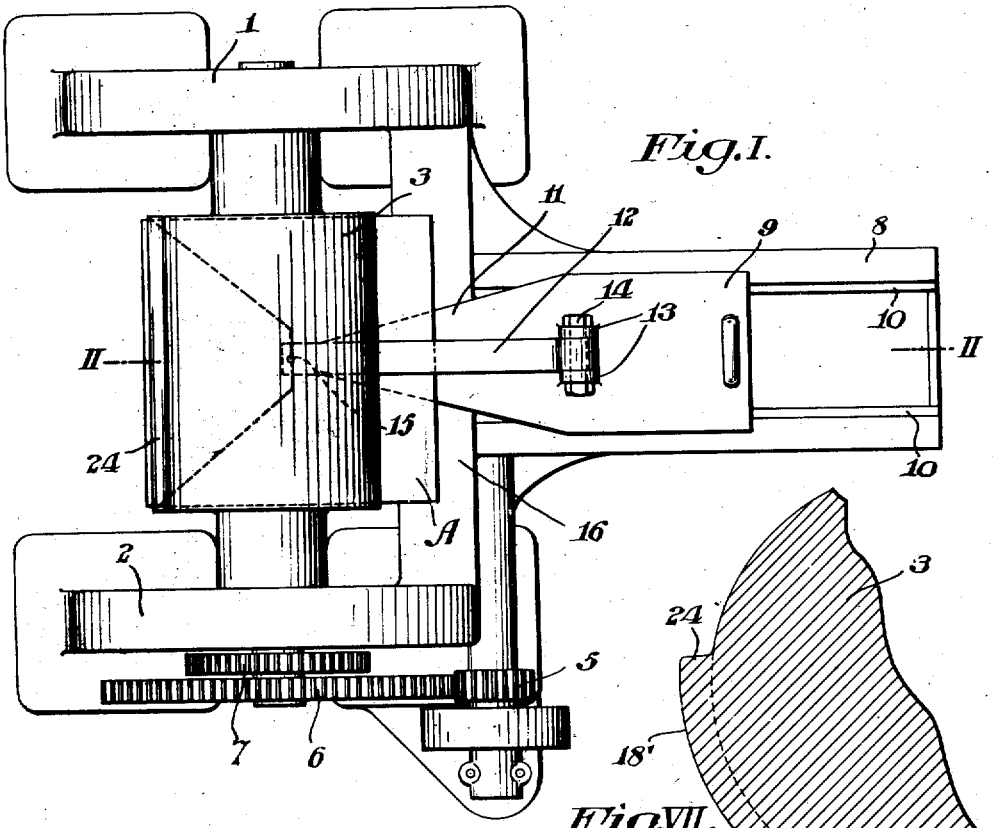
Fig. I.
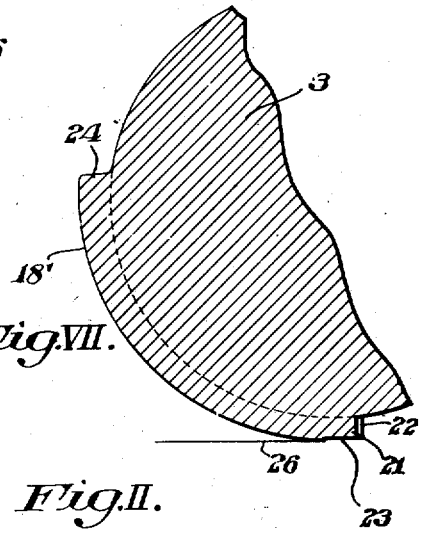
Fig. VII.
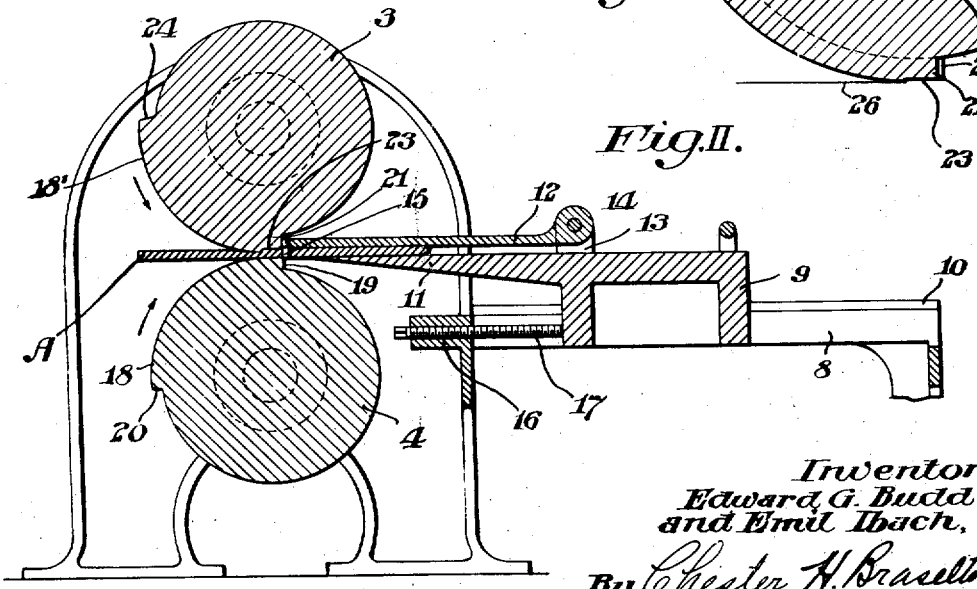
Fig. II.
Inventors
Edward G. Budd
and Emil Ibach,
By Chester H. Brasellton
Attorney.

MACHINE AND METHOD FOR ROLLING TAPERED DISKS AND ARTICLE PRODUCED THEREBY
Original Filed July 3, 1919 3 Sheets-Sheet 2
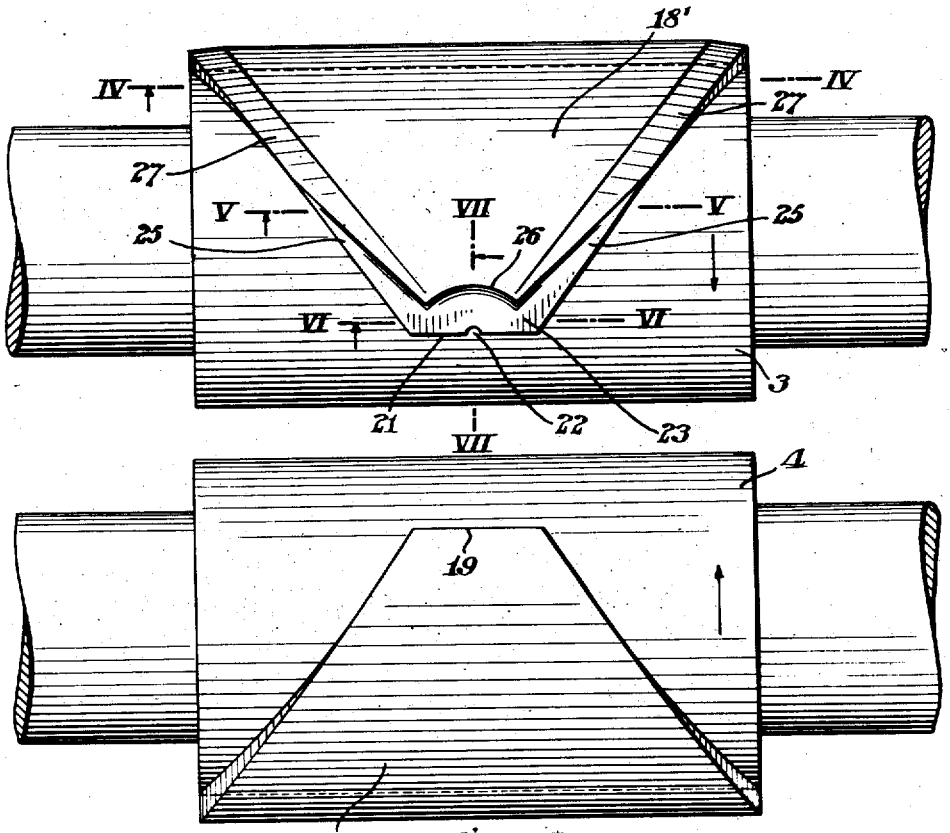
Fig. III.
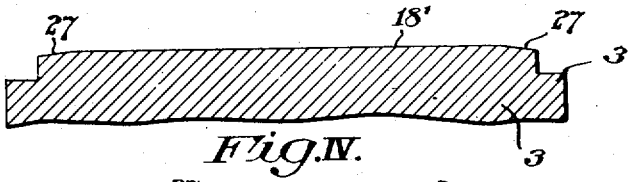
Fig. IV.
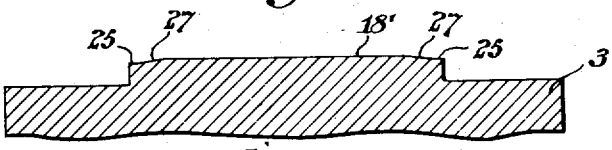
Fig. V.
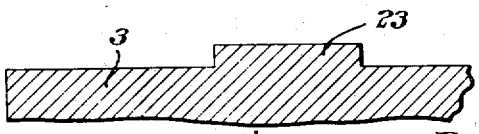
Fig. VI.
Inventors:
Edward G. Budd
and Emil Ilach,
By Chester N. Braselton
Attorney.

MACHINE AND METHOD FOR ROLLING TAPERED DISKS AND ARTICLE PRODUCED THEREBY
Original Filed July 3, 1919. 3 Sheets-Sheet 3
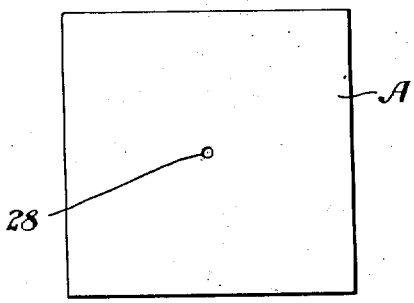
Fig. VIII.
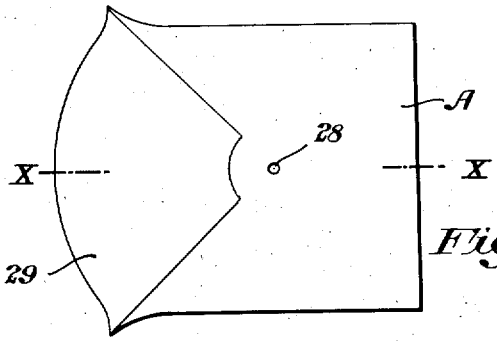
Fig. IX.
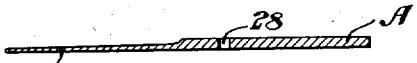
Fig. X.
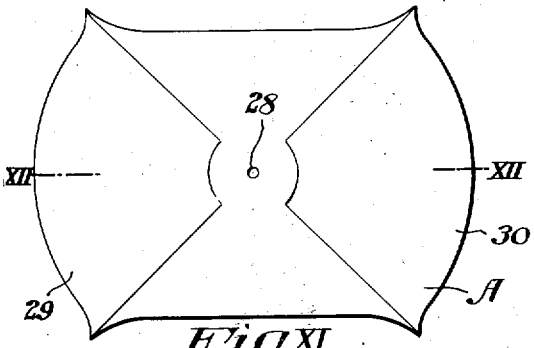
Fig. XI.
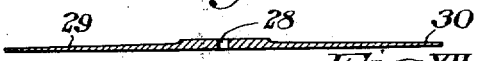
Fig. XII.
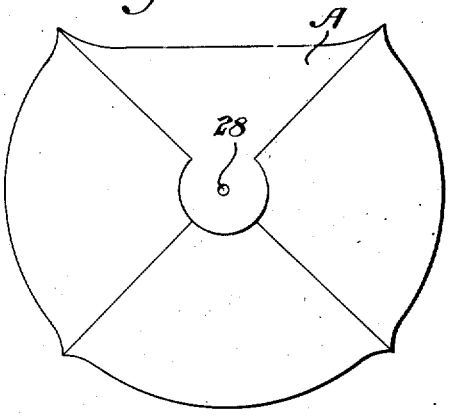
Fig. XIII.
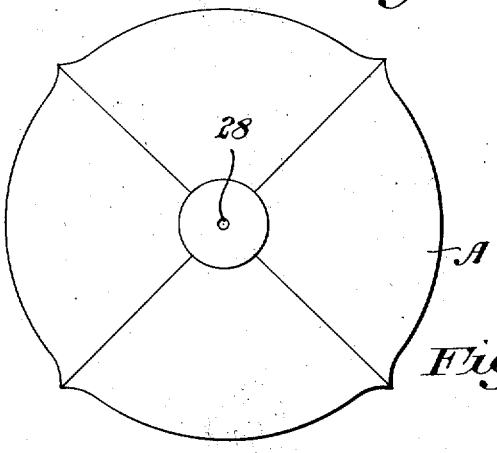
Fig. XIV
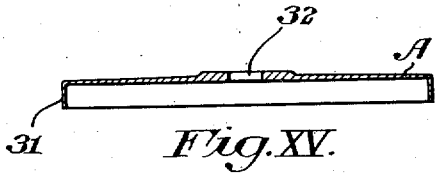
Fig. XV.
Inventors
Edward G. Budd
and Emil Ibach,
By Chester H. Braselton
Attorney.

Reissued Apr. 3, 1934

Re. 19,130

UNITED STATES PATENT OFFICE 19,130

MACHINE AND METHOD FOR ROLLING TAPERED DISKS AND ARTICLE PRODUCED THEREBY

Edward G. Budd, Philadelphia, Pa., and Emil Ibach, New York, N. Y., assignors, by mesne assignments, to Budd Wheel Company, Philadelphia, Pa., a corporation of Pennsylvania Original No. 1,442,601, dated January 16, 1923, Serial No. 308,548, July 3, 1919. Application for reissue February 3, 1934, Serial No. 709,678

43 Claims. (Cl. 80—16)

This invention relates to machines and methods for forming tapered disks and to the tapered disks themselves, for instance, such as are used in the manufacture of disk wheels.

One of the chief objects of our invention is to provide a machine by which tapered steel disks may be formed from a square blank of uniform thickness with a minimum amount of waste and at a low cost.

Another object of our invention is to provide a method or process of forming tapered steel disks from a square blank of uniform thickness.

Another object of our invention is the improved tapered disk resulting from the practice of this method.

Further objects, and objects relating to economies of material and details of operation, will definitely appear from the detailed description to follow. We accomplish the objects of our invention by the devices and means described in the following specification. Our invention is clearly defined and pointed out in the appended claims. A machine constructed in accordance with our invention and capable of carrying out our improved process is illustrated in the accompanying drawings, forming a part of this specification, in which:

Fig. 1 is a plan view of a machine embodying our invention.

Fig. 2 is a sectional view through said machine taken on the line 2—2 of Fig. 1.

Fig. 3 is an enlarged view, in front elevation, of the rolls shown in Fig. 2.

Fig. 4 is a fragmentary, detail, sectional view taken on the line 4—4 of Fig. 3.

Fig. 5 is a fragmentary, detail, sectional view taken on line 5—5 of Fig. 3.

Fig. 6 is a fragmentary, detail, sectional view taken on line 6—6 of Fig. 3.

Fig. 7 is a fragmentary, detail, sectional view taken on line 7—7 of Fig. 3.

Fig. 8 is a plan view of the square blank from which the disk is formed.

Fig. 9 is a plan view of the blank after it has been given a pass in one direction.

Fig. 10 is a sectional view through the blank on the line 10—10 of Fig. 9.

Fig. 11 is a plan view of the blank after the second pass has been given it.

Fig. 12 is a sectional view through the blank on the line 12—12 of Fig. 11.

Fig. 13 is a plan view of the blank after the third pass.

Fig. 14 is a plan view of the blank after the fourth pass, and,

Fig. 15 is a sectional view through the finished wheel disk.

In the drawings, similar reference numerals refer to similar parts throughout the several views, and the sectional views are taken looking in the direction of the little arrow at the end of the section line.

In general our invention consists in rolling rectangular metal blanks of substantially uniform thickness into disks having substantially a circular periphery and which are preferably tapered from the central portion to the periphery thereof, by rolling the metal blank along a plurality of different radii from the center outwardly so as to force the excess metal radially of the blank toward the periphery thereof. This tapers the blank and also causes the periphery thereof to approach a circle. Our invention also comprises a machine for carrying out this method and including a pair of cooperating rolls which act upon the metal blank, one of said rolls having a substantially triangular working surface of cam formation so that points on said working surface are at progressively greater distances from the axis of the roll.

Referring to the drawings, I have illustrated a machine comprising the upright frame members 1 and 2, in which the rolls 3 and 4 are journaled, said rolls being driven in opposite directions from a suitable source of power through the gears 5, 6 and 7. A table 8 extends forwardly from the frame work, and is provided with ways 10, on which the carriage 9 is slidably mounted. The carriage 9 had a part 11 extending towards the rolls and adapted to support the blank A which is to be operated on. An arm 12 is pivoted at its forward end between the lugs 13 on the carriage 9 by means of the bolt or pin 14. A pin 15 projects downwardly from the rear end of the arm 12 and is adapted to extend through a central opening 28, formed in the blank A. This arm 12 and the pin 15 serves as a means for centering the blank with reference to the carriage 9 and consequently with reference to the rolls 3 and 4. A cross bar 16 extends between the uprights 1 and 2 at the forward part of the machine, and a stop screw 17 is threaded through said cross bar so that its forward end extends into a position to be engaged by the carriage 9 and serves as an adjustable stop to limit the movement of the carriage towards the rolls.

A substantially triangular raised portion 18 is formed on the roll 4, extending from the narrow shoulder 19 disposed midway between the ends of the roll to the base shoulder 20 (see Fig. 2) which extends from one edge of the roll to the other. The surface of the portion 18 is, at all points, equi-distant from the axis of the roll 4. A substantially triangular portion is formed on the roll 3 and so positioned on said roll as to cooperate with the portion 18 on the roll 4. This portion extends from the narrow shoulder 21, which cooperates with the shoulder 19 on the roll 4. The working surface on the roll 3 is bounded by the parallel shoulders 21 and 24 (see Fig. 2) and the lines drawn from the ends of the shoulder 21 to the ends of the shoulder 24. A notch 22 is formed centrally in the shoulder 21 so as to accommodate the centering pin 15. At the apex of this triangular portion there is the portion 23 all parts of which are equally distant from the axis of the roll. This portion is defined by the shoulder 21, the edges of the raised portion, the arc of a circle concentric with a notch 22 and covering substantially ninety degrees, and lines drawn from the ends of said arc rearwardly to the edges of the raised portion thus forming the horns 25 which are in the same cylindrical surface with the portion 23. From the line 26 forming the inner boundary of the portion 23, the cam surface 18′ extends rearwardly to the shoulder 24, said cam surface increasing in its distance from the axis of the roll continuously from the line 26 to the shoulder 24. At the edges of the cam surface 18′ there are formed the beveled surfaces 27 which are widest adjacent the shoulder 24 and grow narrower as they approach the parts 25 and the line 26.

The square blank A of uniform thickness, from which the tapered steel disc is formed, is heated and mounted on the part 11 of the carriage 9 and centered by means of the arm 12 and the pin 15. While the rolls are in such position that the working surfaces are on opposite sides of the rolls from each other, the carriage is moved inwardly until it engages the stop 17, thus carrying one half of the blank between the rolls 3 and 4. As the rolls revolve, being driven in opposite directions, the surfaces 18 and 18′ move towards each other until the shoulders 19 and 21 are in line with each other, and the notch 22 receives the pin 15. At this position of the rolls the central part of the blank A is gripped firmly between the surface 18, of the roll 4, and the part 23 of the roll 3. The distance between these parts is such that there is no compression of the blank at this point. By this means the blank is firmly held at the beginning of the rolling operation. As the rolls continue to revolve, the central part of the blank is engaged by the apex of the cam surface 18′ on the roll 3, the blank being given a continuous support by the corresponding surface 18 on the roll 4. As the distance of the surface 18′ from the axis of the roll increases continuously from the line 26 to the shoulder 24, it will be seen that the pressure of the rolls increases continuously and the distance between the working surfaces on the rolls decreases continuously, with the result that the metal of the blank is pressed and squeezed out giving the metal the tapered cross-section and elongating it somewhat. Simultaneously with this rolling or squeezing action on the metal of the blank, which forces the excess metal radially of the blank, the blank is automatically ejected from between the rolls by the rolling action thereof, the carriage 9 moving forwardly on the ways 10 to permit this. The parts 25 in the same cylindrical surface as the part 23 extend rearwardly from the shoulder 21 and prevent buckling or curling of the sheet during the rolling operation as they tend to grip the blank on both sides of the point where the compression is taking place. The beveled edges 27 are provided in order to reduce the compression adjacent the edges of the surface acted upon so as to eliminate the pronounced ridges which would otherwise be caused at this point.

In Fig. 8, we have shown the square blank of uniform thickness from which the tapered disks are formed. In Fig. 9, we have shown this blank after it has been given one pass, as illustrated in Figs. 1 and 2, showing how the blank is elongated and given a curved outline on one edge. Fig. 10 shows the cross-sectional dimensions of this blank. The blank is now given a turn through one hundred and eighty degrees and the opposite edge is rolled from the center outwardly bringing the blank to the form shown in Figs. 11 and 12. The blank is then rotated through ninety degrees and passed between the rolls from the center outwardly bringing the blank to the form shown in Fig. 13. The blank is then turned through one hundred and eighty degrees and given a pass bringing the blank to the form shown in Fig. 14 in which each of the straight sides of the blank has been rolled out to form, in effect, scallops. The blank may be trimmed and finished at this point without rolling it any further, but we find it desirable in many cases to give it four more passes, along the radial lines shown in Fig. 14, in order to eliminate the ridges and cause the periphery of the blank to approach more nearly a circle by forming rolled out portions in the form of scallops, (not shown) intermediate the scallops formed by the first series of passes. After the rolling operation is completed, the blank may be trimmed to bring its periphery to a true circle, the flange 31 is pressed up from the body of the blank and the central opening 32 punched therein thus forming the completed wheel disk.

It will be apparent that, by the use of the machine and method which we have described, a wheel disk of tapered cross-section may be produced very efficiently, and at a low cost. The disk is formed by a simple rolling operation which can be quickly performed and there is practically no waste as the square blank is brought so nearly to a circle that there is very little metal to be trimmed off.

We are aware that the particular embodiment of our invention, which we have described here, is susceptible of considerable variation without departing from the spirit of our invention and, therefore, we desire to claim the same broadly, as well as specifically, as indicated by the appended claims.

What we claim is:

1. In a machine of the class described, the combination of a pair of co-operating rolls, one of said rolls having a substantially triangular portion of its surface raised above the rest of said surface, the distance of said triangular surface, from the axis of the roll, increasing continuously from its apex to its base.

2. In a machine of the class described, the combination of a pair of rolls driven in opposite directions, each of said rolls having a substantially triangular surface raised above the surrounding cylindrical surface of said roll, one of said surfaces increasing continuously in distance from the axis of the roll from the apex of said surface to its base.

3. In a machine of the class described, the combination of a pair of oppositely driven rolls, one of said rolls having a substantially triangular working surface increasing in distance from the the axis of the roll continuously from its apex to its base, and the other roll having a mating triangular working surface with all parts thereof equi-distant from the axis of the roll.

4. In a machine of the class described, the combination of a pair of rolls, one of said rolls having a substantially triangular working surface comprising an area near the apex thereof all parts of which are equi-distant from the axis of the roll and a portion extending from said area to the base of said working surface and in which the distance of the surface from the axis of the roll increases continuously from apex to base.

5. In a machine of the class described, the combination of a pair of rolls, one of said rolls having a substantially triangular working surface comprising a triangular portion, the distance of which from the axis of the roll increases continuously from the apex to the base thereof, and a surface, all parts of which are equi-distant from the axis of said roll, extending in advance of and alongside of the apex of said triangular portion.

6. In a machine of the class described, the combination of a pair of rolls, one of said rolls having a substantially triangular surface, the distance of which from the axis of the roll increases continuously from apex to base, and a bevel at each side of said surface.

7. In a machine of the class described, the combination of a pair of rolls, one of said rolls having a substantially triangular raised portion comprising a substantially triangular surface, the distance of which from the axis of the roll increases continuously from apex to base, a portion in advance of and alongside of said surface all points in the surface of which are equi-distant from the axis of the roll, and a bevel at each side of said triangular surface.

8. In a machine for forming tapered metal disks, the combination of a pair of rolls, one of said rolls having a substantially triangular raised portion, the distance from apex to base being substantially equal to the radius of the disk to be formed, comprising a cam surface of continuously increasing radius and a surface of constant radius in advance of said cam surface and equal in width to the radius of the hub portion of the disk.

9. The process of treating a square metal blank to cause the periphery thereof to approach the circumference of a circle comprising successively rolling the blank in radial directions from the center to the periphery.

10. The process of forming tapered metal disks comprising successively rolling a square blank of uniform thickness in radial directions from the center to the periphery.

11. The method of making tapered disks comprising the rolling of a square blank successively in a plurality of directions extending radially from the center of the blank with a pressure increasing as the radial distance of the part of the blank acted upon from the center increases.

12. The process of forming a substantially circular plate comprising rolling a substantially rectangular blank successively in different directions to force excess metal toward the periphery of the blank.

13. The process of forming a metal plate having a substantially circular periphery and decreasing in thickness from the center to the periphery thereof comprising rolling a substantially rectangular blank of uniform thickness successively in different directions.

14. The process of forming a tapered wheel disk comprising rolling a substantially rectangular blank of uniform thickness successively in different directions and forming a peripheral flange on said rolled blank.

15. The process of forming a substantially circular plate comprising rolling a substantially rectangular metal blank successively in radial directions from the center to the periphery.

16. The process of forming a substantially circular tapered metal plate comprising rolling a substantially rectangular metal blank of uniform thickness successively in radial directions from the center to the periphery.

17. The process of forming tapered disks comprising passing a substantially rectangular metal blank of uniform thickness, successively, between a pair of rollers, one of which has a cam portion of progressively increasing radius.

18. The process of making tapered circular plates comprising the rolling of a substantially rectangular metal blank successively in a plurality of directions radially from the center of the blank with a pressure increasing as successive portions of the blank at increasing distances from the center are acted upon.

19. The process of making tapered circular plates comprising the rolling of a rectangular blank of uniform thickness, successively, along a plurality of different radii, extending from the center of the blank, with a pressure at points in a line radial of the blank proportional to the radial distance of the part of the blank acted upon from the center of the blank.

20. The process of making tapered disks of substantially circular periphery comprising the passing of a substantially rectangular metal blank, along a plurality of different radii between rolls such that the distance between the operating surfaces of the rolls decreases as the distance of the portion of the blank acted upon from the center increases.

21. The process of making tapered disks comprising the rolling of a rectangular metal blank of substantially uniform thickness from the center outwardly along a plurality of different radii to force the excess metal radially towards the periphery of the blank.

22. The process of making tapered disks comprising the rolling of a rectangular metal blank of substantially uniform thickness, from the center outwardly, along a plurality of different radii, between rolls such that the portion of the roll surface in contact with the blank increases and the distance between the working surfaces of the rolls decreases as the distance of the portion of the blank acted upon from the center increases.

23. The process of forming a tapered wheel disk comprising rolling a metal blank of uniform thickness successively in radial directions from adjacent the center to the periphery, the blank being organized into a series of similar and substantially equal unit areas disposed about the center and the successive passes in said rolling being correlated to said areas to reduce and taper the thickness and enlarge the periphery of the blank and finally pressing up a peripheral flange on the rolled blank to true the blank and form a mounting seat thereon.

24. The process of forming a wheel disk comprising rolling a metal blank by passes taken successively in radial directions from adjacent the center to the periphery, the major part of the rolling at one pass extending over an area of the blank corresponding generally to an area of metal defined by radial lines formed by a division of the blank through equally angularly spaced lines drawn from the center to the periphery thereof, each side of a pass in its radially inner portions being spaced laterally from the periphery of the blank, the number of successive rolling passes being at least equal to the number of such areas into which the blank is divided, and the blank being rotated about its center between passes to place additional areas into position for successive passes, whereby the blank is reduced and tapered in thickness and its periphery is successively moved outwardly to enlarge it, and finally pressing up a peripheral flange on the rolled blank.

25. The process of forming a tapered wheel disk comprising rolling a metal blank of uniform thickness and in the form of a substantially regular polygon successively in radial directions from adjacent the center to the periphery by a series of passes, each of which is directed in major part to the rolling of an area of the blank corresponding generally to an area of metal defined by lines drawn from the center of the blank to a pair of adjacent apices, the rolling being continued at least until all of said areas have been treated, and finally without other straightening of the blank pressing up a peripheral flange on the completely rolled blank.

26. The process of forming a tapered wheel disk comprising rolling a metal blank of uniform thickness and in the form of a substantially regular polygon successively in different radial directions from adjacent the center to the periphery, the blank being organized into a series of similar substantially triangular unit areas each bounded by lines drawn from the center to two adjacent apices and a side of the polygon joining said apices and the rolling comprising at least one series of passes each directed chiefly to one of said areas but effecting some reduction of the blank in adjacent areas, and each pass increasing in pressure and width of bite as it proceeds radially outwardly until it reaches the periphery of the original blank, whereby the blank is reduced and tapered in thickness and its periphery is successively moved outwardly to enlarge and round it.

27. The process of forming a tapered disk from a metal blank of uniform thickness which consists in simultaneously rolling both sides of the blank from a point adjacent the center to the periphery thereof in one of a number of similar unit areas into which the area of the blank is divided, then rotating the blank and similarly rolling another of said unit areas and continuing this operation until the blank has been completely rolled, then rotating the blank and similarly rolling an area which substantially overlaps each of two adjacent ones of said previously rolled unit areas and continuing said operation until the blank has been completely re-rolled upon areas overlapping previously rolled unit areas, and finally pressing up a peripheral flange to true the blank.

28. The process of forming a tapered wheel disk comprising rolling a metal blank of uniform thickness successivly in radial directions from adjacent the center to the periphery, the blank being organized into two series of unit areas, each series having its unit areas flanking each other about the center of the blank the two series being equal in number but angularly offset, the rolling comprising two series of passes correlated respectively to the two series of areas, whereby the entire periphery of the blank is rolled out in the successive passes and the extensions produced by the individual passes are left merged together to form a continuous expanded periphery on the blank generally approaching a circle in outline, and without other straightening of the blank pressing up a flange on said rolled blank.

29. The method of economically converting a flat blank of uniform thickness into a tapered wheel disk, which comprises gripping the metal of the blank near the center over an angular extent not substantially greater than 90° between rolling dies, and progressively moving the grip outwardly while maintaining the same angular extent of grip, and simultaneously with said progressive outward movement of the grip increasing the grip by approach of the rolling dies toward each other to taper the blank by displacing metal ahead of the grip and thereby extending the margin of the blank radially, and continuing said rolling in different radial directions until the entire radial outer portion of the blank has been tapered and reduced in thickness and its entire periphery extended, and finally pressing up a peripheral flange on said rolled blank.

30. The method of forming a metal wheel disk from a polygonal blank of uniform thickness by radial rolling which consists in rolling a segment of said blank to expand and extend the same outwardly, then simultaneously re-rolling a portion of such segment and rolling an adjacent portion and continuing until the blank has been completely rolled, then trimming the edge of said blank, and pressing up a peripheral flange on the rolled blank.

31. The method of forming a metal wheel disk from a polygonal blank of uniform thickness which consists in rolling said blank from the center outwardly and expanding the edges in the form of scallops and re-rolling said blank for extending scallops between adjacent scallops, and finally pressing up a peripheral flange on the rolled blank.

32. The method of forming a metal wheel disk from a polygonal blank of uniform thickness by radial rolling which consists in rolling said blank to successively extend the metal at the free boundary edges thereof and between the apices of the polygon and then rolling the blank along segments overlapping lines joining the apices and the center of the blank whereby the metal is extended between the previously extended portions, and finally pressing up a peripheral flange on the rolled blank.

33. The method of forming a metal wheel disk from a polygonal blank of uniform thickness which consists in rolling said blank from the center outwardly in overlapping segments, trimming the circumference of the rolled blank, and pressing up a peripheral flange on the rolled blank.

34. The method of radially rolling a metal wheel disk from a polygonal blank having at least four sides which consists in rolling said blank to extend the metal thereof to form scallops between apices of the blank and subsequently rolling the blank in zones including such apices whereby the metal of the blank is extended to form intermediate scallops and the blank approximates a circle, and finally pressing up a peripheral flange on said rolled blank.

35. The herein described method of rolling a metal wheel disk which consists in simultaneously rolling both sides of the disk from a point adjacent the center of said disk to the periphery thereof in a predetermined segment, rotating the disk after each rolling a distance sufficient to bring a similar segment into position for the next rolling pass, similarly rolling said similar segment and continuing this operation until the blank has been completely rolled, then rotating the disk to bring a segment which substantially overlaps one-half of each of two adjacent previously rolled segments and rolling the same, then rotating blank to bring another of said overlapping segments into position for the next rolling pass and rolling said overlapping segment, and continuing this operation until the disk has been completely re-rolled upon segments overlapping the previously rolled segments.

36. The method of making by radial rolling a circular tapered wheel disk from a polygonal blank having at least four sides which consists in simultaneously rolling both sides of said blank and extending the metal thereof in an equal number of predetermined segments, then re-rolling said blank upon intermediate segments which overlap previously rolled segments, and trimming the edge of the blank to circular form.

37. In a machine for transforming economically a substantially polygonal blank of substantially uniform thickness into a substantially circular tapered wheel disk, the combination of a pair of rolls driven in opposite directions, each of said rolls having a substantially triangular working surface raised above the surrounding cylindrical surface of the roll and adapted to act upon substantially the unit areas subtended by the sides of the polygon to move the metal of the blank chiefly in radial directions, at least one of said triangular surfaces increasing continuously in distance from the axis of the roll from the apex of said surface to the base.

38. In a machine for transforming economically a substantially polygonal blank of substantially uniform thickness into a substantially circular tapered wheel disk, the combination of a pair of cooperating rolls, one of said rolls having a substantially triangular surface, conforming in angular extent substantially to the center angle subtended by a side of the polygonal blank, the distance of which surface from the axis of the roll increases continuously from apex to base, and a bevel at each side of said surface, at least one of said bevels being adapted to move metal of the blank in an adjacent area outside the area engaged by the triangular surface, and to push the adjacent corner of the blank outwardly.

39. A machine for transforming economically a blank of substantially uniform thickness into a substantially circular tapered wheel disk, the combination of a pair of cooperating gap rolls, one of said rolls having a substantially triangular portion of its surface, from the axis of the roll, increasing continuously from its apex to its base, the roll being arranged to initially engage a metal blank of substantially uniform thickness placed between the rolls adjacent the center thereof at the apex of the triangular portion and to increasingly widen the transverse line of engagement of its working face with the blank at least until the roll has travelled in engagement with the blank a distance equal to the distance between the transverse line of its initial engagement to the periphery of the original blank.

40. A machine for transforming economically a blank of substantially uniform thickness into a substantially circular tapered wheel disk, the combination of a pair of cooperating gap rolls driven in opposite directions and adapted in one portion of their rotation to receive a blank to be worked upon between them and in another position of their rotation to work upon a metal blank of substantially uniform thickness and eject it from between them, one of said rolls having a substantially triangular portion constituting its working face, the distance of said triangular working face portion from the axis of the roll increasing continuously from its apex to its base, the apex of the working face, when a blank is in operative position between the rolls, engaging the blank adjacent the center thereof and the transverse line of engagement of the working face with the blank being increasingly widened in the further rotation of the rolls until the working face of the roll has traveled in working engagement with the blank a distance substantially equal to the distance between the transverse line of its initial engagement to the periphery of the original blank, and thereafter the transverse line of engagement with the blank is narrowed toward the base of the triangular portion, the machine being adapted to work successively upon similar unit areas of the blank flanking each other to taper the blank and to radially extend the entire periphery of the blank.

41. A tapered disk adapted for use in vehicle wheels or the like formed by rolling a metal blank of uniform thickness successively in radial directions from adjacent the center to the periphery, the blank being organized into a series of similar and substantially equal unit areas disposed about the center and the successive passes in said rolling being correlated to said areas to reduce and taper the thickness and enlarge the periphery of the blank, and including a peripheral flange pressed up on the rolled blank.

42. A tapered disk adapted for use in vehicle wheels or the like formed by rolling a metal blank of uniform thickness and and the form of a substantially regular polygon successively in different radial directions from adjacent the center to the periphery, the blank being organized in a series of substantially triangular unit areas each bounded by lines drawn from the center to two adjacent apices and the side of the polygon joining said apices and the rolling comprising at least one series of passes each directed to one of said areas, but effecting some reduction of the blank in adjacent areas, and each pass increasing in pressure and width of bite as it proceeds radially outwardly until it reaches the periphery of the original blank, whereby the blank is reduced and tapered in thickness and its periphery is successively moved outwardly to enlarge and round it.

43. A tapered disk adapted for use in vehicle wheels or the like formed by rolling a metal blank of uniform thickness successively in radial directions from the center to the periphery, the blank being organized into two series of unit areas, each series having its unit areas flanking each other about the center of the blank, the two series being equal in number but angularly offset, the rolling comprising two series of passes correlated respectively to the two series of areas, whereby the entire periphery of the blank is rolled out in successive passes and the extensions produced by the individual passes are left merged together to form a continuous expanded periphery on the blank generally approaching a circle in outline, and including a peripheral flange pressed up on the rolled blank.

EDWARD G. BUDD.
EMIL IBACH.